March 3, 1970
R. E. BAILEY
3,498,796
METHOD OF PROCESSING GRAIN SORGHUM
Filed Sept. 8, 1966
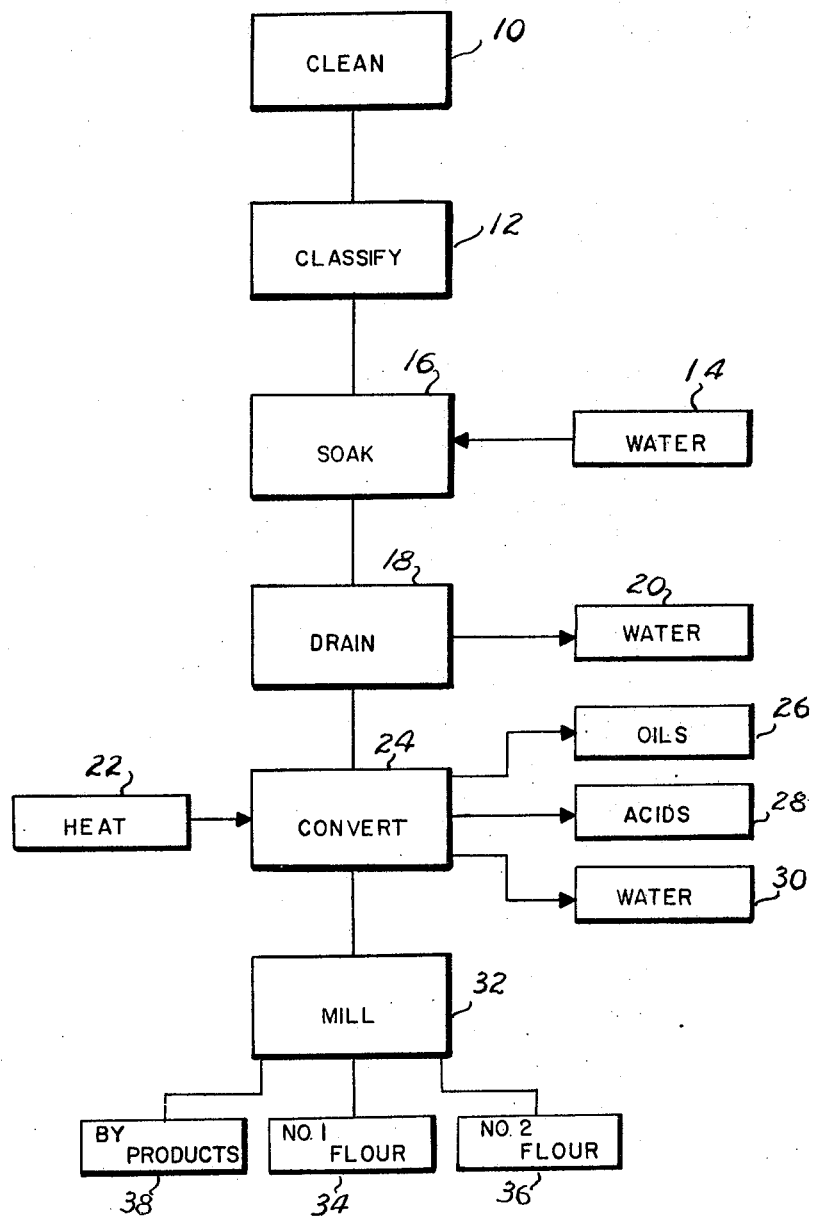
INVENTOR
Richard E. Bailey
BY
ATTORNEY United States Patent Office 3,498,796
Patented Mar. 3, 1970

3,498,796
METHOD OF PROCESSING GRAIN SORGHUM
Richard E. Bailey, 1728 N. Fitzhugh, Apt. 105,
Dallas, Tex. 75204
Filed Sept. 8, 1966, Ser. No. 577,998
Int. Cl. A23l 1/10; B02b 1/04
U.S. Cl. 99—80                    11 Claims

ABSTRACT OF THE DISCLOSURE

A method for processing grain sorghums to provide products suitable for either human or animal consumption including the steps of moistening the grain for a sufficient period to increase the internal moisture content as well as to add surface moisture and heating the grain to a sufficient temperature and for a sufficient time to convert the starch to a softer form without popping or charring the grain and to volatilize a substantial portion of the oils and acids along with excess moisture. The product is then capable of being milled in conventional flour mill machinery.

---

The present invention relates to the processing of grain sorghums such as kafir, yellow maize, hegari, and milo, and more particularly to an improved process for milling grain sorghum.

Grain based food products suitable for human consumption, such as flour, are most often obtained by the milling of cereal grains, and particularly wheat, rather than grain sorghum in this country and many others. In general, a cereal grain can be processed into a palatable state much more easily than a grain sorghum. The grain sorghums are generally much harder than cereal grains, and if grain sorghums are milled into flour using conventional milling processes, only about fifty percent (50%) of the grain is converted into flour because the horny endosperm which comprises a substantial portion of the grain sorghum will not be milled but rather goes into the by-product. Further, flour or other products obtained from milling of grain sorghum are generally characterized by a bitter taste resulting from tannic acid and oils present in grain sorghums.

It is, however, very desirable that the grain sorghum be utilized as a milled food product suitable for human consumption since grain sorghums are readily grown in many parts of the world where wheat or other cereal grains cannot be grown. Even in this country, the cost of grain sorghums is generally substantially less than the cost of wheat or other cereal grains.

The problems inherent in the milling of grain sorghums to provide products suitable for either human or animal consumption have been recognized for many years and various different processes have been suggested for the purpose of facilitating the milling of grain sorghums. For example, it has been suggested that the grain sorghums should be passed through steam to moisten the kernal both inside and outside thereafter subjecting the moistened kernels to heat of degrees sufficient to drive the moisture from the outside and vaporize the internal moisture to cause the husk of the kernels to explode under the force of expansion of the vaporized moisture.

It has also been suggested that the strength of wheat flour can be increased by heating the grain from which the flour is milled at a temperature in the order of 120° to 230° F. after adding to the grain moisture. It is also known to subject cereal grains to a steaming and cooking process of sufficient intensity that the form of cells is entirely destroyed thereafter processing the grain on hot rollers. The prior art also teaches the hydrolization of hulls of cereal grains in an alkaline solution maintained at elevated temperatures in order of 70 to 80 degrees C., neutralizing the steamed grain and thereafter comminuting the grains and dehydrating the grain with hot gases wherein the temperature of gases is not less than 180° C. None of these processes have, however, been accorded any substantial degree of acceptance in milling products suitable for human consumption from sorghums.

The present invention provides an improved method of processing grain sorghum in which substantially all of the grain is converted to products suitable for human consumption which are not characterized by the bitter taste normally associated with products milled from grain sorghums. Further, the flour produced when grain sorghum is milled in accordance with the process of the present invention is especially beneficial in that substantially all of the vitamins, minerals, and protein originally found in the grain is also present in the flour. It is therefore not necessary that the food product be enriched with vitamins, as is normally true of flours milled from wheat. On the other hand, a substantial portion of the oil of the germ is driven off such that the percentage of oil in the present flour is comparable to that of wheat flour, essentially reducing the tendency of the flour to become rancid. Natural enzymes in the flour are rendered inactive, further decreasing the possibility of the flour becoming rancid and all insect larva are killed decreasing the possibility of weevils appearing in the course of storage of the product. The process of the present invention is readily adaptable to production of cracked grain products which are substantially coarser than flour but which is much more palatable than the cracked grain presently used as a food product in many of the less developed countries of the world since the bitterness is removed.

In the practice of the invention, the grain is moistened, suitably by soaking in water or by tempering. The water content of the grain after moistening is suitably in the order of 16% to 22% by weight. Thereafter, the grain is subjected to heat at a temperature of at least 300° F. for a time sufficient to convert the starches of the soft endosperm and the horny endosperm into a more digestible form of carbohydrate, without popping, charring or carmelizing the grain. The term "subjected to heat" as used herein means a heated atmosphere in contact with the grain as the temperature of the heat source will normally by greater and the temperature of the grain will be less due to the thermal mass of the grain and cooling of the grain by evaporation of water. During the heating, a substantial portion of the tannic acid and oil is removed from the grain.

The moistening of the grain is preferably obtained by soaking in water suitably under ambient conditions which may prevail, the necessity of heating of water or applying application of pressure not being necessary. It has been found however, that the grain should be soaked in the water for at least fifteen minutes if best results are to be obtained. The maximum time the grain is soaked is not critical so long as the grain does not remain in the water sufficiently long to cause it to sour. The moistened grain is then subjected to heat at a temperature at least 300° F., and preferably between 340° and 390° F.

It has been found that the optimum temperature and time required for heating is a function of the percentage of the grain comprising the horny endosperm and the aleurone. Further, it has been found desirable to use the maximum temperature that can be used without popping the grain or causing carmelization. Thus, for milo having approximately a 20% horny endosperm and aleurone, a temperature of 360° F. applied for three (3) minutes has been found to convert the soft endosperm and the horny endosperm to a modified form which is extremely soft and also to volatilize virtually all the tannic acid and oils such that when the berry is milled the resulting product will not possess the bitter taste normally characteristic of products milled from grain sorghums and the oil content and moisture content of the flour will be comparable to that of products milled from wheat. It is important that the grain be subjected to high temperatures for short periods of time rather than use substantially low temperatures for longer periods of time if best results are to be obtained.

The milling can be accomplished utilizing conventional equipment to obtain the desired product, whether a cracked grain or a fine flour.

Many objects and advantages of the invention will become readily apparent to those skilled in the art as the following detailed description of the preferred embodiment of the invention unfolds when taken in conjunction with the single figure of the drawing which is a flow diagram illustrating the practice of the present invention.

As indicated in the drawing, the first step in the practice of the invention is to clean the grain as indicated by reference character 10. The cleaning is suitably accomplished using equipment and methods conventional in the milling art for purpose of removing leaves, loose chaff, and other foreign matter.

The grain is then classified as indicated at 12. Classification includes a conventional sizing operation in which the grain is divided into lots depending upon the size of the berry. The grain is also suitably subjected to a conventional moisture test for determining the moisture content of the grain and also a conventional test of determining the protein content. A sample of the grain is skived in order that the percentage of the berry comprising the horny endosperm and aleurone can be measured. Using this information obtained during classification, grain of common size and seed variety is divided into lots dependent upon the percentage of horny endosperm and aleurone present. It has been found practical to divide the grain into three lots, one of which comprises up to 15% of horny endosperm and aleurone, a second lot comprising grain having 15% to 25% horny endosperm and aleurone, and a third suitably comprising grain having 25% to 35% horny endosperm and aleurone. It will be appreciated that the measurement of the percentage of aleurone and horny endosperm is not critical although the maximum temperature to which the grain can be subjected without producing carmelization or popping and the time required for conversion is a function of the percentage of the horny endosperm and aleurone present.

Water 14 is then added to the grain and the grain permitted to soak as indicated at 16 for a period of approximately 15 minutes. If the soaking time is substantially less than 15 minutes, sufficient water or moisture will not be absorbed by the grain for obtaining the most advantageous benefits of the invention. However, the soaking time is not critical otherwise so long as it is not sufficiently long to produce souring. There will also be noted that it is not necessary that the water be heated or applied under pressure. The temperature of the water does affect the soaking time in that at elevated temperatures the soaking time can be decreased and the use of cold water would require longer soaking time. Upon completion of soaking, the total moisture content by weight will be in the order of at least 16% to 22% by weight and the internal moisture content will increase approximately 5% to 6%. As indicated previously, moistening can be obtained by tempering rather than soaking, although soaking is preferred.

After soaking at 16, excess water is removed from the grain by a draining step indicated at 18. The drain 18 is suitably accomplished by removing the grain from the steeping tanks through the utilization of a screw conveyor provided with a perforated bottom through which water can flow. Alternatively, the grain could be passed over a screen permitting the water not absorbed by the grain to flow away. It will be appreciated, however, that many alternative forms of apparatus could be used for the removal of water, such as a centrifuge. It will be noted that a small amount of the tannic acid in the grain will be absorbed by the water during the soaking process, but not a substantial amount.

The grain is then subjected to heat 22 for the purpose of converting the horny endosperm and soft endosperm into a soft, more digestible state. As mentioned above, it is preferred that a screw conveyor be utilized for transporting the grain, that a portion of the screw conveyor be perforated to permit the removal of water. In accordance with the preferred embodiment of the invention, a different portion of the screw conveyor is encased within a heating element which provides a high temperature zone of the screw conveyor. It should be noted that by suitably enclosing the heating zone with insulating material, the heating can be accomplished quite efficiently and desired temperatures maintained. The length of the heated zone of the screw conveyor is such that time required for grain to pass through the heating zone will be as desired and can be controlled by controlling the speed of the screw conveyor. Other forms of apparatus such as a rotary kiln can be used.

During the time the heat is applied to the grain, a substantial portion of the oils 26 and acids 28 are removed as volatile vapors along with any excess moisture 30. Thus, when the converted grain is milled into flour, the flour will have oil and water content comparable to that of wheat. The temperature and time of treatment to be utilized during the converting step 24 will vary depending upon the characteristics of the grain in a particular lot. It is therefore desirable that prior to commencement of processing of grain is substantial quantities that small test runs be made for purposes of determining the optimum times and temperatures.

In accordance with one specific example of the invention wherein the grain was milo and the horny endosperm and aleurone comprised approximately 15% of the berry, a soaking time of 15 minutes was utilized and thereafter the grain was subjected to heat for three minutes at a temperature of 350°. In accordance with another specific example of the invention, wherein the milo comprised approximately 25% horny endosperm and aleurone, the grain was soaked for 30 minutes and subjected to heat at a temperature of 365° for 3 minutes. In accordance with still a third specific example of the invention, wherein the grain was milo having 35% horny endosperm and aleurone, after soaking for 30 minutes the grain was subjected to heat at a temperature of 385° for 4 minutes for the purpose of accomplishing the converting step.

The moistening of the grain prior to heating to obtain conversion is extremely important. The moisture absorbed by the grain is vaporized when heat is applied, providing a cooling effect which prevents charring and carmelization of the grain. Further, the presence of moisture is believed essential to the removal of tannic acid and oils as it is believed to render them more volatile. It has been found that if the grain was not moistened, the desired conversion and removal of tannic acid and oils did not occur, but rather the grain became carmelized and charred.

Subsequent to the conversion, the grain can be milled to provide the desired food product. A conventional cracking mill can be used if cracked grain is desired. It has been found that cracked grain produced using the principles of the present invention possesses many desirable characteristics not found in cracked grain not treated. The food product is much more easily digested and does not possess the bitter taste characteristic of cracked grain sorghums.

Conventional flour mill machinery can be used for milling, as indicated at 32 if the desired product is flour. However, since the grain when converted is softer than even soft wheat, capacities of the mill is effectively increased. Further, since the horny endosperm is converted to a soft material which is readily millable, when the grain is milled as indicated at 32, approximately 95% of the grain will be converted to flour with approximately 65% being number 1 flour as indicated at 34 and approximately 30% being number 2 flour as indicated at 36. Only 5% of the grain will result in by-products 38 not suitable for human consumption.

The flour obtained after milling is comparable in fineness and color to wheat flour and only contains approximately 1% or less oil. The moisture level is also compatible to that of wheat flour, being less than 10% and can be adjusted to any desired level. Any insect larva or eggs present in the grain are killed by the heat used during the converting step. Further, the combination of water and heat is also effective to inactivate the various enzymes found in the grain. As the enzymes are inactivated and the flour is characterized by a very low percentage of fat, the flour does not become rancid except under extreme conditions and has excellent shelf life. The enzymes can be activated, however, by addition of gluten wheat flour.

It will be noted that in order to obtain a high percentage of flour from the milling process, virtually all of the soft endosperm and horny endosperm must be converted. The degree of conversion is a function of the amount of horny endosperm present and the temperatures used during the converting step. Thus, for example, it has been found that if milo having approximately 15% horny endosperm and aluerone is subject to temperatures of 300° F. for three minutes, only a portion of the soft and horny endosperm will be converted. When milled only 50% of the product would be flour with the remaining 50% being by-products.

If, on the other hand, the temperatures used are excessive, the grain will either pop or become charred or carmelized. Upon the occurrence of any of the above, the grain is not suitable for milling.

The product resulting from the process of the present invention is suitable for use in prepared products for human consumption such as prepared meats, bakery goods, syrup fillers, extenders and similar products. The product does not possess the bitter taste characteristic of the grain sorghums and is white and of a fine texture. Although the flour cannot be used alone in bakery products, due to lack of a necessary type of gluten which reacts with yeast, it has been found that it has excellent baking properties and approximately 25% of the flour used in most bakery products can be grain sorghum with the remaining 75% being wheat flour.

The nutritional value of the product is quite high since it is a digestible carbohydrate rather than a raw starch. Also the grain sorghum flour is characterized by a very high iron content and the necessary vitamins are present without necessity for enrichment as is true in wheat flour.

What I claim is:

1. Process of treating grain sorghums comprising the steps of:
    (a) moistening the grain sufficiently to increase the internal moisture content at least 5% and to provide sufficient surface water to cause the total moisture content by weight to be at least 16%, and
    (b) subjecting the grain to heat at a temperature of at least 300° F. for a time sufficient to convert the starch of the horny endosperm and the soft endosperm to a softer form without popping, charring, or carmelizing the grain and to remove a substantial portion of the tannic acid and oil from said grain.

2. A process as defined in claim 1 wherein the grain is moistened by soaking in water for a period of at least 15 minutes and thereafter draining excess water from the grain.

3. A process as defined in claim 1 wherein the grain is subject to heat at a temperature between 340° and 390° F.

4. A process as defined in claim 1, further including the step of classifying the grain prior to moistening in accordance with the amount of aleurone and horny endosperm in the said grain.

5. A process as defined in claim 4 further including the step of passing the grain through a roller mill to crush the grain into particles of smaller size than the grain.

6. A process as defined in claim 4 wherein grain having up to about 15% aleurone and horny endosperm is subjected to heat for about 3 minutes at a temperature of about 350° F.

7. A process as defined in claim 4 wherein grain having 15% to 25% aleurone and horny endosperm is subjected to heat for about three minutes at a temperature of about 365° F.

8. A process as defined in claim 4 wherein grain having 25% to 35% aleurone and horny endosperm is subjected to heat for about four minutes at a temperature of about 385° F.

9. A process as defined in claim 1, wherein said grain is milo.

10. A process in accordance with claim 1 wherein said grain is selected from a group consisting of milo, kafir, yellow maize, and hegari.

11. A process as defined in claim 1 wherein the internal moisture content of the grain is increased approximately 5% to 7% during the moistening and sufficient surface water is present to cause the total moisture content by weight to be in the order of 16% to 22%.

References Cited

UNITED STATES PATENTS

| | | | |
|---|---|---|---|
| 332,073 | 12/1885 | Gillman et al. | 99—80 XR |
| 3,222,183 | 12/1965 | Rozsa et al. | 99—93 |

ALVIN E. TANENHOLTZ, Primary Examiner

J. R. HOFFMAN, Assistant Examiner

U.S. Cl. X.R.

99—93; 241—8